Nov. 24, 1925.  1,563,155
M. L. BUCKINGHAM
TEAPOT
Filed Feb. 27, 1925   2 Sheets-Sheet 1
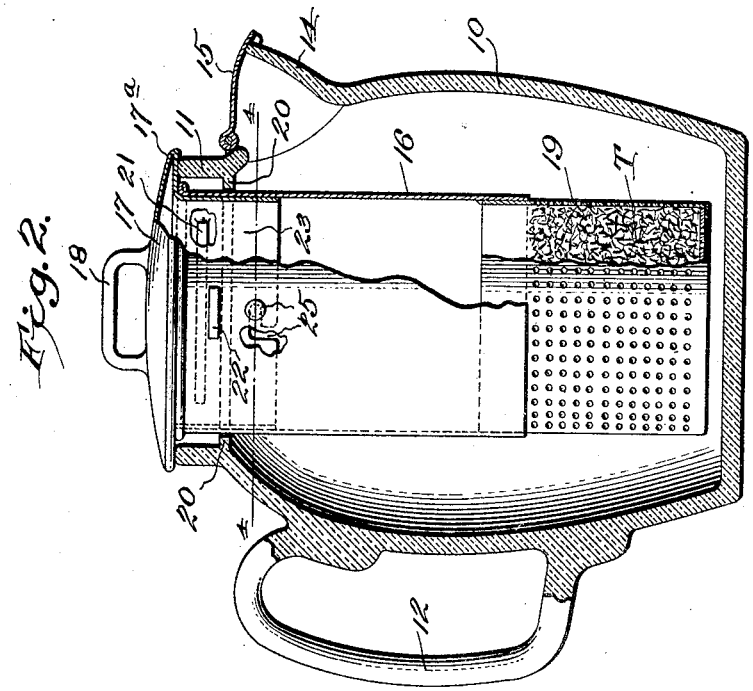
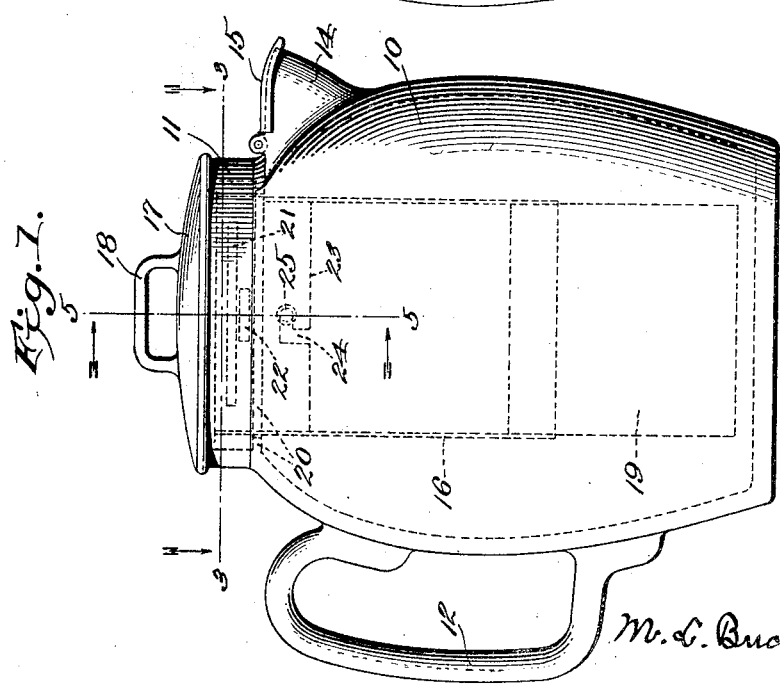
Inventor
M. L. Buckingham
By
Herbert E. Peck   Attorney Nov. 24, 1925.  M. L. BUCKINGHAM  1,563,155
TEAPOT
Filed Feb. 27, 1925   2 Sheets-Sheet 2

Inventor
M. L. Buckingham
By
Hubert E. Peck  Attorney

Patented Nov. 24, 1925.

1,563,155

UNITED STATES PATENT OFFICE.

MARIA L. BUCKINGHAM, OF DECATUR, ILLINOIS.

TEAPOT.

Application filed February 27, 1925. Serial No. 12,005.

*To all whom it may concern:*

Be it known that I, MARIA L. BUCKINGHAM, a citizen of the United States of America, and resident of Decatur, county of Macon, State of Illinois, have invented certain new and useful Improvements in and Relating to Teapots, of which the following is a specification.

This invention relates to certain improvements in tea pots; and the nature and objects of the invention will be readily recognized and understood by those skilled in the art involved in the light of the following explanation and detailed description of the accompanying drawings illustrating what I at present consider to be the preferred embodiments or mechanical expressions of my invention from among various other forms, arrangements, combinations and constructions of which the invention is capable within the spirit and scope thereof.

The invention deals generally with certain problems and disadvantages encountered in the use and operation of pots and the like vessels for brewing beverages, and is primarily and more particularly directed to such pots employed for brewing tea.

One of the considerable disadvantages met with in tea and the like pots, is the difficulty in cleaning them and in maintaining these pots in the desired sanitary condition to prevent generation of odors, and the contamination of the pots and the materials used therein, and resulting effect upon the quality, flavor and other desired characteristics of tea brewed therewith and thereby. This difficulty and disadvantage is generally due to the construction and arrangement of such pots, with an extended pouring spout forming a more or less restricted and tortuous passage to which access is not readily had for cleaning, and to the further necessity in pots of this type in universal use, for providing a strainer or perforated member at some point in or controlling the flow of tea through such spouts to remove undesirable matter such as tea leaves, sediment and the like from the tea before discharge for consumption.

Therefore, one of the main and fundamental objects of this invention is to eliminate the foregoing disadvantages and difficulties by the provision of a construction and arrangement of tea and the like pots which will permit of their being readily cleaned and maintained in the desired sanitary condition.

Another object of the invention is to provide a tea or the like pot with a construction and arrangement of pouring spout which is readily interiorly accessible and can be easily and thoroughly cleaned.

A further object of the invention resides in the provision of a tea or the like pot, with a novel construction, arrangement and mounting of a tea leaf container and cover therefor, which are detachably mounted in position in and closing the pot and readily detachable and removable therefrom as a unit, and in which the tea leaf container and cover are detachably connected so that the cover can be removed from the container and serve as a cover for the pot with the container removed therefrom.

A further object of the invention is to provide a tea or the like pot of simple construction and arrangement capable of being readily manufactured at small cost, and which is so formed and designed as to provide for ready access to all portions of the interior thereof to permit of quickly and thoroughly cleaning the same to maintain the pot in a sanitary, odorless condition.

With the foregoing general objects, and certain other objects and results in view, which other objects and results will be readily apparent from the following explanation, the invention consists in certain novel features in construction, and in combination and arrangement of parts, as will be more fully and particularly referred to and specified hereinafter.

Referring to the accompanying drawings, in which similar reference characters refer to corresponding parts throughout:

Fig. 1 is a view in side elevation of one form of tea pot embodying my invention, with the tea leaf container and portions of the cover indicated by dotted lines.

Fig. 2 is a vertical section through the tea pot of Fig. 1 and through portions of the tea leaf container and cover.

Figure 4:
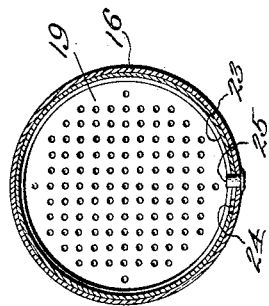
Fig. 4 is a horizontal section through the leaf container and cover taken on the line 4—4 of Fig. 2.
Figure 5:
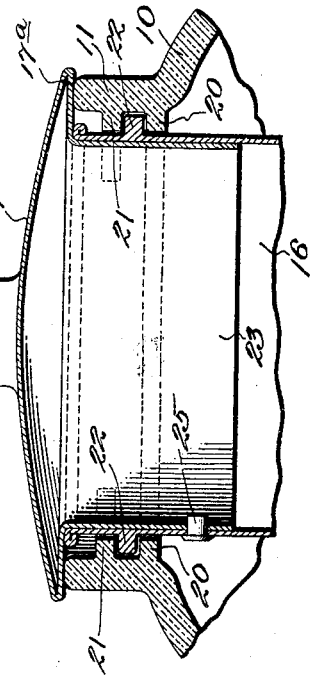
Fig. 5 is a transverse, vertical section through the neck portion of the tea pot taken on the line 5—5 of Fig. 1.
Figure 3:
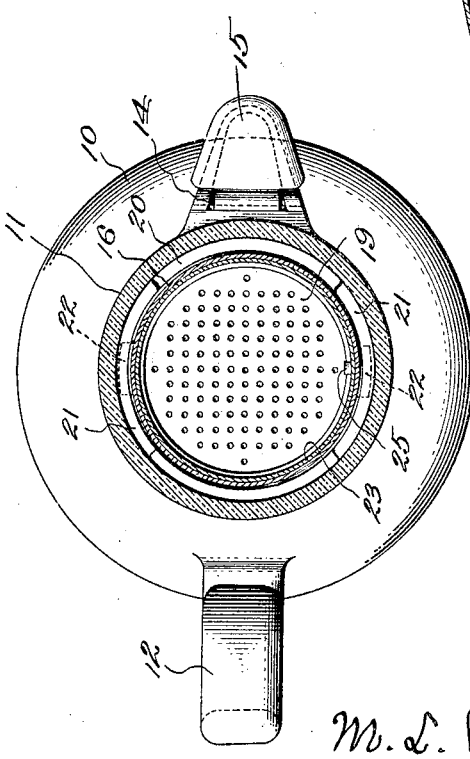
Fig. 3 is a horizontal section taken on the line 3—3 of Fig. 1, through the neck of the tea pot with the leaf container and cover in mounted position.

In the example of the invention presented herewith for purposes of explaining the various features thereof, a tea pot is disclosed and described, of the earthenware or crockery type. However, the invention is not limited in all its features to embodiment in tea pots but is of general adaptation to and embodiment in pots or vessels of such types, nor is the invention restricted to the material from which the pot or vessel is formed, as metal or other materials may be employed if desired without going beyond the bounds of the invention, all of which will be readily apparent to those familiar with the art to which the present invention pertains.

The illustrated embodiment provides the pot or vessel 10, referring now to Figs. 1 and 2 of the drawings in particular, formed of earthenware or the like and having the outwardly bulged or extended side walls terminating at the upper end or side thereof in a relatively large top opening surrounded by a relatively short, vertically disposed annular neck portion 11 forming a continuation of the side walls of the pot of smaller diameter than the diameter of the outwardly bulged portions of the walls of vessel or pot 10. At one side, the vessel or pot 10 is provided with the usual or any other desired handle 12. The foregoing arrangement and formation of the pot or vessel 10 conforms to the more or less conventional type of tea and the like pots or vessels.

With the form of pot 10, according to the invention, a spout 14 is provided thereon through the side thereof opposite the handle 12, and this spout is disposed extending outwardly through the wall of pot 10 below and in proximity to the neck portion 11, so as to form a relatively short, straight passage from and in communication with the interior of the pot 10. Preferably, although not necessarily, a cover 15 is provided over and closing the spout 14, and this cover is hinged or otherwise suitably pivoted at the inner side of the spout 14 adjacent the neck 11 of pot 10. Thus, by the foregoing formation and arrangement of the pot or vessel 10 and the spout 14 therefor, the interior of the vessel is readily accessible for cleaning through the relatively large, open top surrounded by neck 11, and the relatively wide and short spout 14 forms an unobstructed passage easily and quickly cleaned.

According to the invention, a tea leaf container 16 is provided for removable mounting in the pot 10 detachably suspended from the neck 11 thereof, and a cover or closure 17 having a handle 18 is removably carried by and closing the container 16. The tea leaf container is preferably formed of metal in tubular form having a closed bottom and open top, with the lower portion of the container and the closed bottom thereof perforated to provide the strainer portion 19 of the container 16. The container 16 can be formed if desired of sections, the lower one of which provides the strainer member or portion 19, or the container can be formed and constructed as a one-piece unit structure, as will be readily understood. The tea leaf container 16 is detachably locked at the upper end thereof in and to the neck 11 and depends downwardly through the interior of the pot to and terminating spaced a distance from the bottom wall of the pot, as clearly shown in Figs. 1 and 2 of the accompanying drawings.

The detachable mounting and suspension of the container 16 in pot 10 is provided for by the following construction of the pot neck 11 and the upper portion of the container 16. An annular flange or shoulder 20 is formed around the interior of the neck 11, extending substantially horizontally from the lower or inner end thereof at the approximate line of junction of the neck 11 with the side walls of the pot 10. Intermediate the shoulder 20 and the upper, outer edge of the neck 11, ribs 21 are disposed in diametrically opposite, alined positions on and extending from the inner side of neck 11, and terminate spaced apart and their adjacent ends to form diametrically opposite passages between the ends thereof on the neck 11. The upper end of the tea leaf container 16 is formed with the exterior projections or lugs 22 at diametrically opposite positions thereon and spaced downwardly or inwardly a distance from the open end edge of the container, and these projections 22 are, in the present example, of an elongated form having a length less than the distance between the ends of the ribs 21 on neck 11, so as to permit free passage of the projections through the spaces between the ribs. The tea leaf container is mounted in operative position in the pot or vessel 10, by lowering the same downwardly into the pot through the neck 11, until the opposite projections 22 of the container pass between the spaced ends of the neck ribs 21, and rest upon and engage the shoulder 20 around the inner end of the pot neck 11. With the container in this position, it is rotated or turned until the projections 22 pass beneath or under the ribs 21, which lock and secure the container against outward movement or displacement from the pot, while the shoulder 20 supports the container in position suspended in the pot and spaced from the bottom wall thereof. The projections or lugs 22 are spaced inwardly at such a distance from the upper or outer open end thereof as to support the container from shoulder 20, with the lower end of the container spaced from the bottom of the pot, and the open end edge thereof positioned substantially flush or alined with the upper edge of the pot neck 11, as will be clear by reference to Fig. 2 in particular of the accompanying drawings.

The cover 17 for the tea leaf container 16 and the pot 10 is formed and arranged for detachable mounting on and connection with the container, and provides a further feature of the invention. The cover proper is formed of a diameter to extend completely over and closing the open upper end of the pot 10, and is provided with the tubular depending sleeve portion 23 of a diameter to fit within, be received by and form a slip joint or running fit with the interior of the open upper end of the tea leaf container 16. The provision of the sleeve portion 23 depending from and of a smaller diameter than the cap 17, forms the annular flange or shoulder portion 17ª of the cover which fits upon and onto the upper edge of the pot neck 11 to close the open top of the pot. The invention provides for the detachable locking of the cover 17 and sleeve portion 23 thereof to the container 16, by forming an angle or bayonet slot 24 in and open through the lower edge portion of the cover sleeve 23, and providing a locking pin or lug 25 extending inwardly from the side wall of the container 16 in position to enter and be received by the slot 24. The cover 17 is detachably locked on and to the tea leaf container to form a unit therewith, by inserting the sleeve portion 23 of the cover into the open end of the container with the pin 25 received in slot 24, and then turning or rotating the cover until the pin moves into the angle or locking portion of the slot, as will be readily understood by reference to the drawings. In mounted attached position on the container 16, the cover 17 closes the open end thereof, with the flange portion 17ª of the cover bearing on the upper edge of the container, and forms a unit with the container for mounting in and removal from the pot or vessel 10.

In operation and use of a tea pot embodying the invention, the tea leaf container is supported with the required ingredients, as the tea leaves T indicated in Fig. 2 of the drawings, and the cover 17 is then detachably mounted and locked on and closing the open end of the container, as hereinbefore explained. In mounted, attached position, the cover 17 forms a unit with the container 16, and provides through handle 18, the means by which the container can be readily inserted in and removed from pot 10. The container 16 is inserted in the pot 10 and detachably locked in position suspended therein, through the medium of the projections 22 and the shoulder 20 and spaced ribs 21, in the manner described above, and in mounted position the cover 17 closes the open upper end of the pot, with the flange portion 17ª of the cover extending across and resting on the upper edge of the pot neck 11. With the container in position the water or other liquid employed can freely circulate over, around and under the perforated portion 19 of the container for free access to the material T therein, while this perforated portion 19 strains and prevents the material T from escaping into the brew in the pot 10. In this manner the elimination of all perforated members or strainers from, or controlling passage of the brew through, spout 14 is secured, so as to leave the spout unrestricted and unobstructed for ready access to clean the same.

When it is desired to remove container 16, the same is rotated to position with lugs or projections 22 alined with the spaces between ribs 21, and is then lifted from the pot by cover 17 and handle 18. Cover 17 can then be removed by unlocking pin 25 from slot 24. In brewing tea, it is desirable to remove the tea leaves from the brew when a certain desired strength is obtained in the brew, so as to maintain the brew at this strength. With the tea pot of the invention this is readily accomplished by removing the tea leaf container 16, and cover 17 as a unit, and then detaching the cover from the container for replacement on and covering the open top of the pot 10, the cover 17 being so formed as to be adapted for use on the pot either alone or when attached to the container.

A tea or the like pot embodying the foregoing features in construction and arrangement is capable of being easily and quickly cleaned after use and maintained in the proper sanitary condition. With the container 16 and cover 17 detached and removed the total interior surface of pot 10 is accessible for cleaning through the relatively large open top thereof; and due to the formation of the short and straight spout 14, it likewise is interiorly accessible for thorough cleaning. The formation of the tea leaf container is also such that it can be easily cleaned, so that the tea pot described embodies those highly desired characteristics of efficiently brewing the desired beverage, and of being easily thoroughly cleaned.

It is evident that various changes, modifications, substitutions and variations might be resorted to without departing from the spirit and scope of my invention, and hence I do not desire to limit myself to the exact and specific disclosures hereof.

Desiring to protect my invention in the broadest manner legally possible, what I claim and desire to secure by Letters Patent of the United States, is:

1. In a tea pot, in combination, an open top vessel, a tea leaf container detachably mounted and locked in and suspended from the open top of said vessel, and a cover for said container and vessel detachably mounted on, and connected with the container, said container and cover removable from and replaceable in said vessel as a unit.

2. In a tea pot, in combination, an open top vessel having a vertically disposed neck portion, a tubular open top container detachably mounted in and locked to said neck portion and depending therefrom into and through the vessel, a cover formed with a handle, detachably mounted on and locked to said container to close the same and in mounted position closing said open top vessel, and the said cover and container removable from and replaceable in said vessel as a unit by said cover handle, the said cover detachable from the container and adapted for closing said vessel with the container removed therefrom.

3. In a tea pot in combination, a vessel having an open top surrounded by a vertically disposed neck portion, a shoulder around the inner portion of said neck adjacent the lower end thereof, opposite ribs on the interior of said neck spaced apart at their ends and spaced upwardly from said shoulder, a tubular container formed with opposite exterior lugs adapted to pass between the ends of said ribs and said ribs and shoulder, the said container detachably locked in position depending into said vessel by said lugs supported on the shoulder of said neck and confined against displacement therefrom between said shoulder and ribs on said neck.

4. In a tea pot, in combination, a vessel having an open top surrounded by a vertically disposed neck, an inwardly extending shoulder around the interior of said neck, locking ribs on the inner side of said neck spaced from said shoulder and spaced apart at their ends, a tubular container formed with spaced exterior lugs at the upper end thereof, said container detachably mounted in said vessel depending through the neck thereof by said lugs supported on said neck shoulder and confined between the shoulder and said locking ribs, and a cover for the container and vessel, said cover detachably locked to the container in position to close the same and to close the open top of the vessel, the said cover and container removable from and replaceable in the vessel as a unit.

5. In a tea pot, in combination, a vessel having an open top surrounded by a vertically disposed neck, a tubular open top container detachably locked to said neck and depending therefrom into said vessel, a locking pin on the interior of said container, and a cover for said container formed with a depending sleeve portion provided with a bayonet slot having a horizontally disposed portion; said cover detachably locked to said container with the bayonet slot receiving said container locking pin, said container and cover removable from the vessel as a unit.

6. In a tea pot, in combination, a vessel having an open top, a tubular open top container detachably locked to said vessel and depending through the open top of the vessel a distance thereinto, said container provided with an inwardly projecting locking pin adjacent the open end thereof, and a cover for the container and vessel embodying a radially disposed flange portion and a depending sleeve portion having a bayonet slot therein formed with a vertical portion and a horizontally disposed portion, said cover detachably locked to said container with the skirt portion thereof within the container and said locking pin received in the horizontal portion of the bayonet slot, the cover closing said container and vessel and the container and cover removable from the vessel as a unit.

Signed at Decatur, Illinois, this 24th day of Feb., 1925.

MARIA L. BUCKINGHAM.